United States Patent
Weber et al.

(10) Patent No.: US 8,046,383 B2
(45) Date of Patent: Oct. 25, 2011

(54) MAPPING DEEP STRUCTURED DATA STRUCTURES

(75) Inventors: Franz Weber, Wiesloch (DE); Soeren Balko, Weinheim (DE); Matthias Miltz, Heidelberg (DE)

(73) Assignee: SAP AG, Walldorf (DE)

( * ) Notice: Subject to any disclaimer, the term of this patent is extended or adjusted under 35 U.S.C. 154(b) by 530 days.

(21) Appl. No.: 11/923,095

(22) Filed: Oct. 24, 2007

(65) Prior Publication Data

US 2009/0112887 A1    Apr. 30, 2009

(51) Int. Cl.
*G06F 17/30* (2006.01)

(52) U.S. Cl. ........ 707/802; 707/756; 707/791; 707/795; 707/803; 707/804; 707/809; 707/810; 707/811

(58) Field of Classification Search .................. 707/758, 707/756, 791, 795, 802–804, 809–811
See application file for complete search history.

(56) References Cited

U.S. PATENT DOCUMENTS

| | | | | |
|---|---|---|---|---|
| 5,848,426 | A * | 12/1998 | Wang et al. | 715/210 |
| 5,909,570 | A * | 6/1999 | Webber | 703/13 |
| 6,823,495 | B1 * | 11/2004 | Vedula et al. | 715/805 |
| 6,874,141 | B1 * | 3/2005 | Swamy et al. | 717/144 |
| 7,076,729 | B2 * | 7/2006 | Mani et al. | 715/239 |
| 7,284,196 | B2 * | 10/2007 | Skeen et al. | 715/234 |
| 7,636,894 | B2 * | 12/2009 | Vedula et al. | 715/763 |
| 7,676,756 | B2 * | 3/2010 | Vedula et al. | 715/763 |
| 2002/0174098 | A1 * | 11/2002 | Wu et al. | 707/1 |
| 2003/0212698 | A1 * | 11/2003 | Mani et al. | 707/102 |
| 2005/0015732 | A1 * | 1/2005 | Vedula et al. | 715/805 |
| 2005/0021513 | A1 * | 1/2005 | Vedula et al. | 707/3 |
| 2007/0112843 | A1 * | 5/2007 | Swamy et al. | 707/102 |
| 2008/0263034 | A1 * | 10/2008 | Dey et al. | 707/6 |

OTHER PUBLICATIONS

Tidwell, Doug, XSLT, Aug. 23, 2001, O'Reilly Media Inc., ISBN 978-0-596-00053-0, various pages.*

* cited by examiner

*Primary Examiner* — Frantz Coby
(74) *Attorney, Agent, or Firm* — Mintz, Levin, Cohn, Ferris, Glovsky, and Popeo P.C.

(57) ABSTRACT

Methods and apparatus, including computer program products, for mapping deep structured data structures. Statements defining a mapping of source elements formatted in accordance with a first hierarchical structure to a target formatted in accordance with a second hierarchical structure are received. The first and second hierarchical structures may be different. A mapping of the source elements to the target in accordance with the statements may be performed, where the statement may be defined in accordance with a mapping language. The mapping language may define that a single statement may represent an iterative approach to mapping elements from the source to the target. The mapping language may support selection of source elements using a format that allows for navigation through a hierarchy of the source. The mapping language may also support nested statements which may allow for nested iterations in which to perform mappings.

20 Claims, 4 Drawing Sheets

400

ROOT

FIRSTNAMES    ← 410

NUMBER_OF_EMPLOYEES

COMMENTS ← 420

TITLE ← 430

DESCRIPTION ← 440

EMPLOYEE

NAME

FIG. 4

MAPPING DEEP STRUCTURED DATA STRUCTURES

BACKGROUND

The present disclosure relates to data processing by digital computer, and more particularly to mapping deep structured data structures.

Data structures may be described in a hierarchical format, which may be referred to as being deep structured, in a document. For example, an XML (eXtensible Markup Language) formatted document may describe a data structure by having nodes of a tree that are higher up represent data of a higher hierarchical level than dependent nodes that are lower that represent data of a lower hierarchical level.

There may be different formats for data structures in documents where the different formats may represent a same data structure differently or may represent different types of data structures to represent a same set of underlying data. For example, a first document may describe a first type of a data structure while a second document may describe a second type of a data structure, where the same underlying data is represent by both data structures. Transferring data from one document that has one format to another document with another format may involve mapping data by manually selecting nodes of one data structure and nodes of a second data structure to which to map the data.

SUMMARY

The subject matter disclosed herein provides methods and apparatus, including computer program products, that implement techniques related to mapping deep structured data structures.

In one aspect, data characterizing a source document, a target document, and a first statement defining a mapping from one or more elements of the source document to one or more elements of the target document is received. The first statement is defined in accordance with a language for describing mappings between elements of source documents and elements of target documents where each statement expressed as a combination of a source selection, an assignment operation, and a target selection represents performing the assignment for each instance of each element of a source document matching the source selection for a hierarchy level of the statement. The first statement is evaluated to find instances of the elements of the source document identified by the first statement, where the elements are part of a hierarchy of nodes in the source document. For each of the instances of the elements of the source document found based on the evaluating the first statement to find instances of the elements of the source document, instances of the elements of the target document to which to map data from the instances of the elements of the source document are determined and the instances of the elements of the target document are populated with data from the instances of the elements of the source document based on the determining. The determining includes navigating through a hierarchy of elements of the target document being different from the hierarchy of the elements of the source document, the navigating being defined by the first statement.

In a related aspect, data characterizing a source document, a target document, and statements including a first statement and a second statement is received. Each of the first and second statements defines mappings from one or more elements of the source document to one or more elements of the target document. The second statement is a mapping depending on an evaluation of the first statement. The first statement is evaluated to find instances of first elements of the source document identified by the first statement, where the elements are part of a hierarchy of elements in the source document and the instances are identified by a selection of a type of element in the first statement. For each of the instances of the first elements of the source document found based on the evaluating the first statement to find instances of the first elements of the source document, instances of the first elements of the target document to which to map data from the instances of the first elements of the source document are determined and the instances of the first elements of the target document are populated with data from the instances of the first elements of the source document. The determining includes navigating through a hierarchy of elements of the target document being different from the hierarchy of the elements of the source document, the navigating being defined by the first statement. The populating includes, for each of the instances of the first elements of the target document, evaluating the second statement to find instances of second elements of the source document being at a lower hierarchy level in the source document than a corresponding instance of the first elements of the source document on which an instance of the second element depends, and for each of the instances of the second elements of the source document found based on the evaluating the second statement to find instances of second elements of the source document, determining instances of the second elements of the target document to which to map data from the instances of the second elements of the source document and populating the instances of the second elements of the target document with data from the instances of the second elements of the source document. The determining includes navigating through the hierarchy of elements of the target document, the navigating being defined by the second statement.

In a related aspect, one or more statements defining a mapping of source content formatted in accordance with a first hierarchical structure to a target formatted in accordance with a second hierarchical structure are received. The first and second hierarchical structures are different. A mapping of the source content to the target in accordance with the statements is performed.

The subject matter may be implemented as, for example, computer program products (e.g., as source code or compiled code tangibly embodied in computer-readable media), computer-implemented methods, and systems.

Variations may include one or more of the following features.

Elements of a source document may be nodes and elements of a target document may be containers to which nodes are to be mapped.

A source selection may include a reference to elements of a source document.

A source selection may include a function that when executed results in elements of the source selection.

Populating results in elements of the source document may include populating the elements in a different hierarchy level in the target document (e.g., in a higher or lower hierarchy level).

A source selection of a statement may include an expression in accordance with a format similar to XPATH (eXtensible Markup Language Path Language).

A statement may be part of a mapping description in accordance with a mapping language.

A first statement may be related to a second statement being a child statement depending on the first statement. The second statement may be evaluated based on the evaluation of the first statement.

The subject matter described herein can be implemented to realize one or more of the following advantages. A mapping language may be used to define mapping descriptions including mapping statements that may be used to describe mappings from source elements of a source document to target elements of a target document where the documents may include deep structured data.

The mapping language may be described such that a single statement may encompass multiple, iterative mappings to be performed based on a selection of a sequence of source elements. Such an approach may ease the definition of such mappings drastically. In addition, this approach may help such that a mapping need not include a mapping of congruent structures in a way that includes explicit control flow (e.g., looping) to map dynamic, unbounded and deeply structured data.

The mapping language may support nested mapping statements such that iterative mapping of hierarchies may be simplified.

The language may allow for an approach similar to a map and reduce approach which may be described hierarchically top down. For each hierarchy level in the target structure there may be one so called "mapping part", which describes the construction on that level in the context of the already constructed upper levels. Consequently hierarchy levels may be nested. The source for each mapping part in turn may be described by an XPATH-like description of navigation in the source. During this construction it may be possible to lift or lower and to combine hierarchy levels of the source in a target. Filtering, projections and arbitrary single element transformations may be described. Elements can be added to a target document by different assignment operations. Relational operators that allow navigating up and down hierarchy levels may be supported. The approach may be considered similar to a map and reduce approach as a selection of source elements and a target element may be a mapping and an assignment operation may provide a reduction.

A mapping language may be used to model data manipulation in data flows. This in turn may be used in process design as well as service composition. For example, the mapping language may be applied to request and response documents as specified in a WSDL (web service description language) specification. In that example, it may be appropriate to generate web service parameters and process the respective response and fault messages by mapping parameters from a source document of a response to a target document in the system receiving the response.

Details of one or more implementations are set forth in the accompanying drawings and in the description below. Further features, aspects, and advantages will become apparent from the description, the drawings, and the claims.

BRIEF DESCRIPTION OF THE DRAWINGS

FIG. 4 is a description of a type structure for a target document.

Like reference numbers and designations in the various drawings indicate like elements.

DETAILED DESCRIPTION

Figure 1:
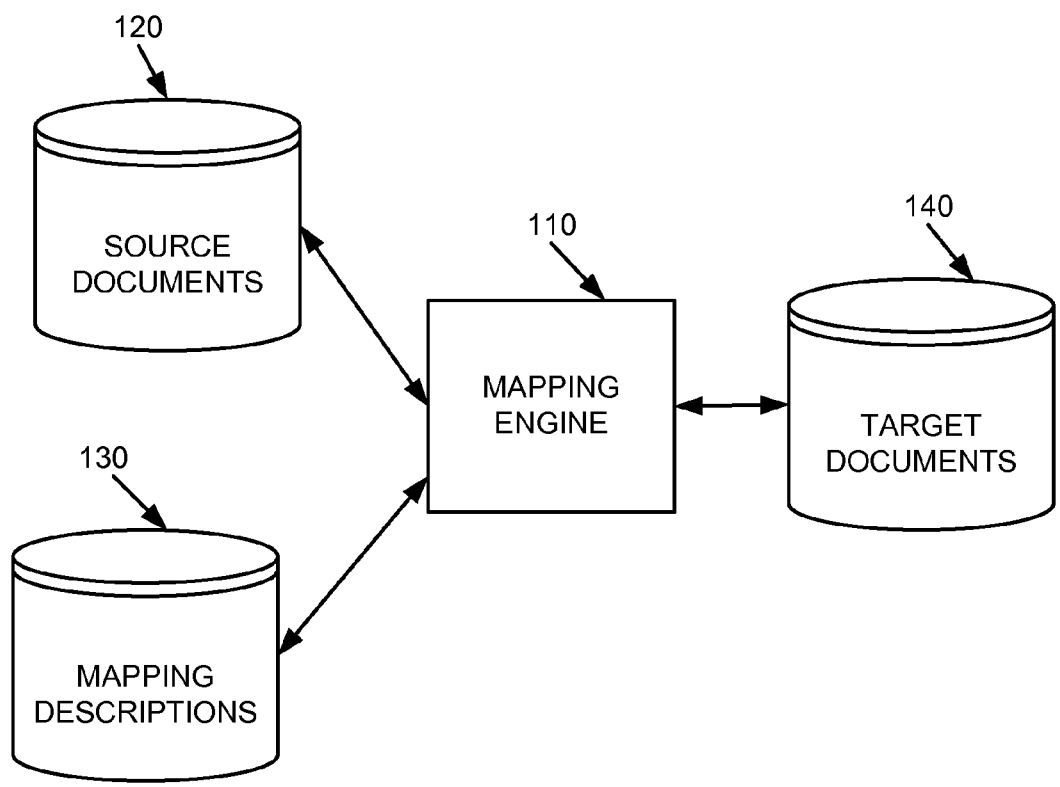
FIG. 1 is a block diagram of a system to perform a mapping of deep structured data from a source document to a target document.

In general, in FIGS. 1-4, deep structured data may be a nested structure of nodes and containers, both of which may be considered elements. A node may carry a value as well as hold a set of containers. A container may be named and may hold a sequence of nodes. Containers in a node may be accessed by a name of a container and nodes of a container may be accessed by an index (e.g., a nonnegative integer). Deep structured data described by nodes and containers may be referred to as a node/container hierarchy. Although the description will refer to nested structures of nodes and containers, in implementations, hierarchical elements of deep structured data may vary. For example, names other than nodes and containers may apply to deep structured data and features of the hierarchical elements may vary.

Data that is deep structured may represent one or more data structures, which may be resident in volatile memory or persistent memory of a computer system. One or more data structures may be included in an electronic document, which, for example, may be an ASCII (American Standard Code for Information Interchange) text document in which data structures may be described in accordance with a format. For example, eXtensible Markup Language (XML) tags may be used to describe nodes and containers, where content of a tag may represent values of a node or container. In general, an electronic document may be any type of electronic file in which data may be stored.

For example, the following code may describe deep structured data.

```
Node: null
    Container: "USER"
        Node: null
            Container: "FIRSTNAME"
                Node: "John"
                Node: "Jeremy"
            Container: "LASTNAME"
                Node: "Java"
            Container: "ID"
                Node: "1234"
```

An XML representation of the same deep structured data may be the following.

```
<WRAPPER>
    <USER>
        <FIRSTNAME>John</FIRSTNAME>
        <FIRSTNAME>Jeremy</FIRSTNAME>
        <LASTNAME>Java</LASTNAME>
        <ID>1234</ID>
    </USER>
</WRAPPER>
```

In general, data may be mapped from a first set of data objects to another set of data objects in accordance with a description for mapping data described by a mapping language. For example, a list of statements in accordance with a mapping language may describe a mapping of data from a first set of data objects to a second set of data objects. A set of data objects may be represented in a description of data, such as a description in an electronic document.

The data objects of source and target documents may be data objects described in accordance with a format similar to service data objects of the Service Data Objects Framework maintained by the Open Service Oriented Architecture collaboration. A hierarchy of data for data objects may be described by what may be referred to as a type structure, where different type structures may represent different types of data objects. A type structure may be used to determine where to map elements based on a mapping description.

A mapping language may use a set of constructs to describe mapping in such a way that one statement may be used to indicate an iterative approach to mapping data according to that statement from a source to a target. Advantageously, an amount of description required for an automatic mapping based on the language may be reduced, which may facilitate easier writing of mapping descriptions, easier debugging of mapping descriptions, and the like.

FIG. 1 is a block diagram of a system 100 to perform a mapping of deep structured data from a source document to a target document. The system 100 includes a mapping engine 110, source documents 120, mapping descriptions 130, and target documents 140. In general, operation of the system 100 may involve the mapping engine 110 using a selected mapping description from the mapping descriptions 130 and a selected source document from the source documents 120 to determine a mapping from the selected source document to a selected target document from the target documents 140.

The mapping descriptions 130 include electronic documents that contain one or more statements that describe a mapping from a source document to a target document. The statements may be written in accordance with a mapping language which may be interpreted by the mapping engine 110.

Each statement of a mapping language may include a combination of three constructs which may be used to describe a mapping. The constructs may include an identification of a source element (e.g., a source node or container of deep structured data in a source document), an identification of a target element (e.g., a source node or container of deep structured data in a target document), and an assignment operation to be performed.

The mapping language may be described in such a way that the mapping of a source element is to be applied iteratively for each source element matching the identification. In addition, the mapping language may be described such that statements may be nested. Mappings may apply iteratively to statements in a nested fashion such that for each mapping according to an outer statement, an iteration through each identified source element is applied. An example language is discussed with reference to FIGS. 3-4.

In general, as described above, the mapping engine 110 interprets a mapping description to determine how to map data from a source document to a target document. A selection of a mapping description, a source document, and a target document may be received by the mapping engine 110 as input. For example, the selection of each may be received as part of an Application Programming Interface (API) call to the mapping engine 110.

The source documents 120 and the target documents 140 include deep structured data that may be structured in accordance with a node/container hierarchy. The source documents 120 may be in a different format from the target documents 140. Differences in format may include a different organization of hierarchies, such as a different combination of nodes that make up data structures, different naming conventions, different formats for describing elements, and the like.

Although the system 100 of FIG. 1 includes a certain combination and type of components, implementations may vary. For example, the system 100 may further include a user interface for selecting a source document, a target document, and a mapping description.

As another example, mapping descriptions may be read into a compiler for a mapping language and used to generate executable code that may be used to perform a mapping. In this fashion, executable code for specific mappings may be generated.

As another example the system 100 may be employed in a messaging landscape, where data of incoming messages may be mapped to another format. In such a landscape, a source document may be a payload of a message and a mapping description may be selected based on a type of message received.

As another example, a mapping description may be selected automatically. For example, a mapping description may be selected based on features of a source document that are detected. For example, based on a type of message that contains a data description, an expected format of the message may be determined and the determination of the expected format may be used to select a mapping description to use for translating data from that format to another format.

As another example, a selection of a target document need not be provided to a mapping engine. For example, a target document may be generated based on a source document and mapping description.

Figure 2:
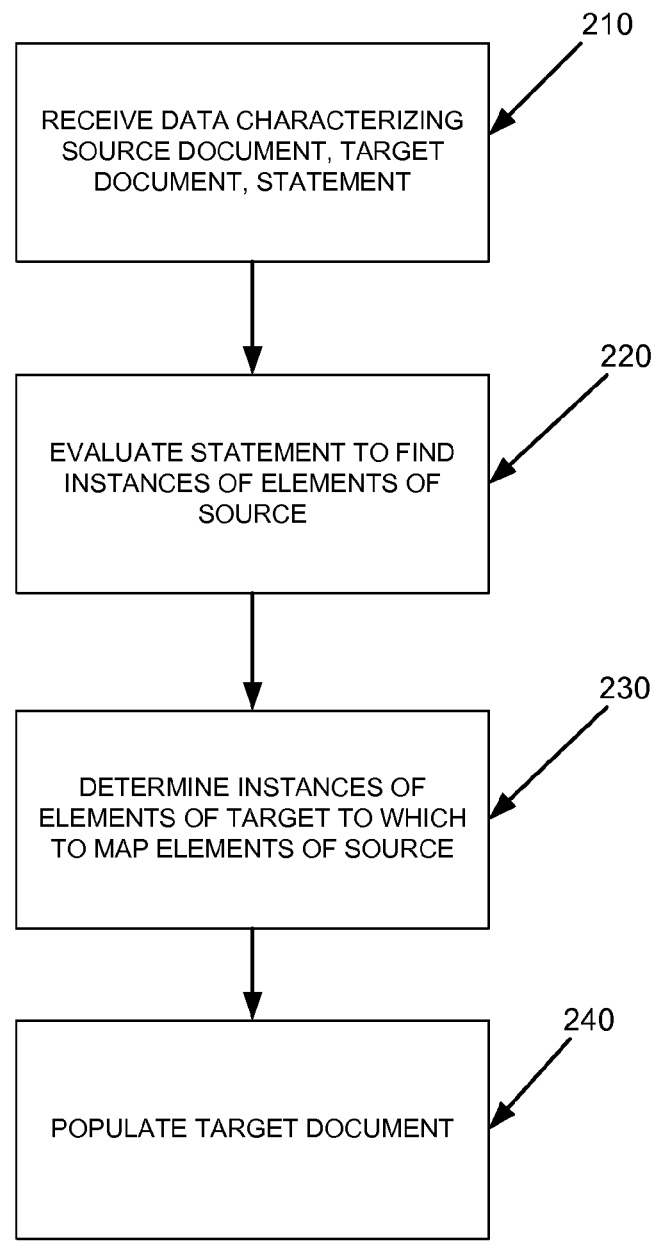
FIG. 2 is a flowchart illustrating a process of performing a mapping deep of structured data from a source document to a target document.

FIG. 2 is a flowchart illustrating a process 200 of performing a mapping deep of structured data from a source document to a target document. The process 200 may be performed in the system 100 of FIG. 1. In general, the process involves receiving data characterizing a source document, target document, and a statement (210); evaluating a statement to find instances of elements of a source document (220); determining instances of elements of a target document to which to map elements of a source document (230); and populating a target document (240).

Data characterizing a source document, target document, and a statement is received (210). The data may be a name of a source document, a name of a target document and a mapping description including statements that are in accordance with a mapping language, such as the example mapping language discussed with reference to FIG. 3. For example, the mapping statement may be in accordance with a language for describing mappings between elements of source documents and elements of target documents where each statement is expressed as a combination of a source selection, an assignment operation, and a target selection represents performing the assignment for each instance of each node of a source document matching the source selection for a hierarchy level of the statement. A source document may be the same as or different from a target document. A target document might not exist and might be generated for the purpose of mapping a source document to a target document.

A statement is evaluated to find instances of elements of a source document (220). For example, the statement may be the statement made in accordance with a mapping language and the statement may be evaluated to determine a source element or elements selected in the statement. For example, a literal, reference, function, or combination of any of those may be used to select elements of a source document. For example, evaluating a reference used for source selection may include navigating through a hierarchy of elements of a source container of a source document to find elements matching the source selection. One or more instances of elements of a source document may be found. For example, a reference, as described below, may refer to multiple nodes.

Instances of elements of a target document to which to map elements of a source document are determined (230). Determining instances of a target document to which to map elements of a source document may include navigating through a hierarchy of a target document to find an element (e.g., a node or container) to which a target selection of a statement identifies. The sub-process of determining instances of elements of a target document may include evaluating an assignment operation of a statement. For example, a set assignment operation may result in a target selection being determined as an element to which to map or an append assignment operation may result in a new node being determined as an element to which to map. Instances of elements of a target element to which to map elements may be generated (e.g., prior to populating a target element or as part of populating a target element) or may already exist. For example, a node of a target document might not exist and may be generated and that node may be an instance of an element of a target element to which to map.

A hierarchy of a source document may differ from a hierarchy of a target document or they may be the same. To understand a hierarchy of data structures of a document there may be type structure descriptions which describe the hierarchy of each data type.

A target document is populated (240). Populating the target may include populating a value of a target element based on a value of a selected source element. The populating may include populating multiple elements based on there being multiple source elements.

Although the process 200 of FIG. 2 includes a certain number and type of sub-processes, implementations may vary. For example, nested mapping parts may be evaluated to support nested mappings.

Figure 3:
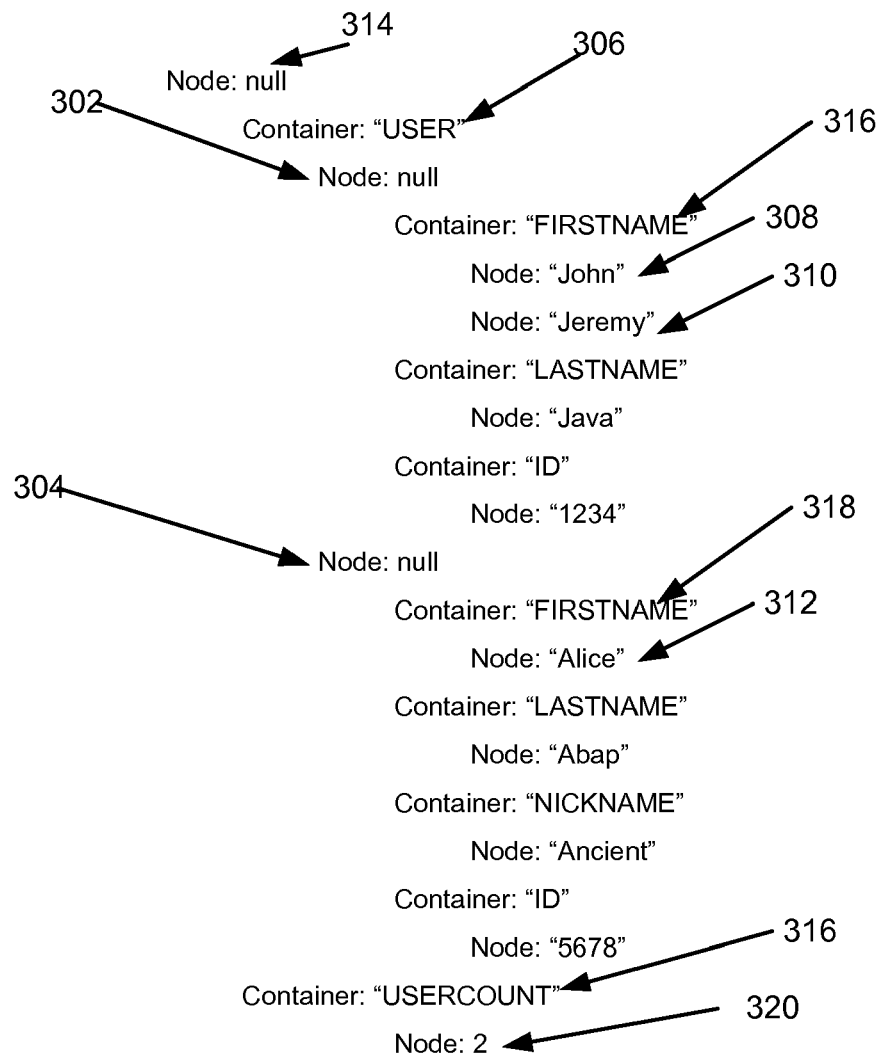
FIG. 3 is a deep structured data description.

FIG. 3 is a deep structured data description 300. The description 300 may be part of a source document that may be used to map data from the description 300 to a target document. The description 300 is in accordance with an example format that will be discussed with reference to an example mapping language.

The example language describes that a statement of the language includes a combination of three constructs. The three constructs include a selection of a source element, a selection of a target element, and an assignment from a selected source element to a selected target element.

In the example language, statements may be related to other constructs of the language as follows. A statement in the language may also be referred to as a mapping part. A combination of statements may be linked together (e.g., through nesting). A set of statements that are to be applied to a source document may be referred to as a mapping description.

In the example language, a statement may be modeled as: Source Selection-(Assignment Operation)→Target Selection, where "Source Selection" denotes a selection of one or more source elements (and may also be referred to as a source expression), "Assignment Operation" denotes a type of assignment operation to be performed between a source and target element, and "Target Selection" denotes a selection of one or more target elements (and may also be referred to as target identification).

One special expression may be an empty one (which does not contain any steps at all); on evaluation it may receive an input node and returns exactly this node as output. Source selections may be broken into parts that may be referred to as steps. For example, a selection of a source may involve a chaining of steps, as will be described below.

In general, both source selection and target selection may navigate from a starting point of a root node of a source document and a root node of a target document, respectively, where a starting point may be referred to as an entry point. A selection may start from other starting points, for example, if a language allows for it or dictates it in circumstances. For example, if statements are nested, a child statement may start from a node other than a root node.

In general, a selection of a source element may receive a node as input and return a sequence of nodes as output. A selection may be simple by, for example, selecting a node with a particular name or value, or more complex by being performed as part of a function. An output sequence may contain nodes in the same sequence in which they show up in content.

In the example language, types of source selection may include literals, references, and function invocations, each of which may be referred to as a step. A literal may be used to select nodes having a predefined, specified value. For example, if a source selection includes the text 'John' then evaluation of the source selection may result in selection of all nodes having the value 'John.' Literals may be differentiated from references based on inclusion in single quotes.

A reference may be used to select nodes of a specified container. References may be written in accordance with a statement in accordance with an XPATH (XML Path Language) or similar format, where the statement includes a hierarchy of containers that may be interpreted to determine a navigation through a hierarchy of data structures. As an example reference with respect to the description 300, a reference "USER" may select a first user node 302 and a second user node 304 of the user container 306, where the nodes in the description 300 represent instances of a container in which a node resides. As another example, a reference "USER/FIRSTNAME" may select a first FIRSTNAME node 308, a second FIRSTNAME node 310, and a third FIRSTNAME node 312, where the XPATH-like structure of the reference is used to navigate through the description 300.

A function invocation may be used to select nodes, where operations of a function may be performed to determine which nodes to select. For example, a statement may include a function as a source selection where the function provides a list of nodes as output to be used as source elements. For example, a function call "firstInstance(FIRSTNAME, USER)" may be invoked and the function may define to only return each first instance of a node in a parent container such that only the first FIRSTNAME node 308 and the third FIRSTNAME node 312 are selected from each of their respective, parent USER nodes 302, 304.

Functions may be used to select nodes that are not contained within a provided input and can not be represented by predefined values. For example, if there is knowledge of features of nodes based on provided input but not sufficient knowledge of exact nodes (e.g., to select nodes based on a reference or literal), a value of an input node may be used to dynamically create an output node sequence.

A function invocation may be a step that takes exactly one node as input. With such a restriction, an input may be as deeply structured as a function requires such that a function implementation has access to a complete substructure which may include many nodes. For example, a concatenation function may require an input node to own three containers, such as a "PREFIX" container, a "BODY" container and a "SUFFIX" container, each of them holding respective invocation parameter node.

An input node to a function may be specified as a mapping rather than a reference, such that a complex node need not be selected as input, but may be constructed on-the-fly by rearranging existing primitive and complex nodes. This may be especially useful for functions requiring deeply nested input (e.g. many web service calls).

In general, a function invocation that may be of the form of "function name" ("pairs of source selection to target selection generating a complex node on-the-fly"), where function name may be a name of a function to be invoked that is performed on a complex node constructed based on the pairs of source selection to target selection. Each function may have its own source/target node structure as input/output. On function invocation, a mapping may be performed from a node representing the function input to a result being a node representing the function output.

As examples, a function to be invoked for one pair of source and target selection that is used to generate a complex node for input may be in a format of:

function(source→target); whereas, a function to be invoked for multiple pairs of source and target selections that generate a complex node with multiple parameters may be in a format of

```
function(
    source -> target
    source -> target
),
``` where each "source→target" pair may be used to select a source and target to which a complex node may be generated and used as input for the function.

Evaluation of a second or subsequent source of a pair may be handled similar to child statements, which descend based on a currently active source node (as discussed above). A second or subsequent target selection may switch to an empty root node representing function input. These selections of input and output may be for as long as evaluation resides within function invocation; once a function finishes, an activate source node and target container may return to their expected state with result nodes of the invocation as source, target node as prior to a function invocation.

For example, a sample function may be toUpperCase( ), which takes a string as input and returns the capitalized string as result. Assuming that the input parameter is called VALUE, a complex input type may look like:

INPUT
VALUE

Following the example, a function invocation may look like:

toUpperCase('Hello world'-(SET)→VALUE), where toUppperCase is the name of the function, 'Hello world' is a literal used for source selection, SET is a set assignment operation, and VALUE is a name of a target container.

Evaluating the function invocation may cause the toUpperCase function to get invoked with this input node:

```
Node: null
    Container: "VALUE"
        Node: "Hello world"
```

The function would use that input node to perform a conversion of the text to upper case. That input may reside in a target document with changes performed by the function. For example, a target document may include:

```
Node: null
    Container: "VALUE"
        Node: "HELLO WORLD"
```

A result of a function invocation may be accessed by chaining additional steps to an invocation step, either directly or within child mapping parts (e.g., by nesting statements). In some instances, a complex output type may be needed that contains an invocation result.

Literals, references, and functions may be steps that are combined together to select source nodes; such a combination may be referred to as chaining as it may result in an output sequence of one step being used as an input sequence of another step. For example, literals may be chained in the expression "'this'/'is'/'a'/'test'" to select a node carrying value "test". In that example, each step is separated by the slash character '/'.

As another example, references may chained together such that an evaluation of a "USER/FIRSTNAME" may result in nodes with the values "John", "Jeremy" and "Alice" from the first and second FIRSTNAME nodes 308, 310 of the first FIRSTNAME container of the first USER node 302 and the first FIRSTNAME node 312 of the first FIRSTNAME container 318 of the second USER node 304.

As another example, an expression "a/b/c" consists of three steps (a, b, and c) which may each be references to XSD (XML Schema Definition) elements or attributes in a source structure. The expression may return as many source nodes as there are "c"s under "b"s under "a"s.

In contrast to literals and references, functions may be a dedicated flavor of steps which compute a source node from a list of parameters. There may, for instance, be an expression like "a/f(b)/d" where f(b) returns a structure which contains element(s) "d". The overall expression may select all "d"s in all results of "f(b)" applied to all "b"s under all "a"s.

As another example, a literal may be chained with a reference, where a size of resulting intermediate sequences are respected, such that, an expression "USER/LASTNAME/'Employee'" may select a sequence of all nodes carrying a value "Employee" that are within a USER/LASTNAME container hierarchy.

As another example, a combination of the reference "USER/FIRSTNAME" and the literal "John" may be "USER/FIRSTNAME/'John'", which may be used to select the first FIRSTNAME node 308. As another example, a reference may be chained with a literal, such that an output sequence includes nodes contained within the literal.

Combining different types of steps may be helpful, for example, to provide access to nodes not contained anywhere within a provided input node but required as input for subsequent handling (e.g. as a parameter in a function invocation).

In general, a selection of a target element may receive a node as input and return a container as output. In contrast to the variety of approaches for selecting source nodes, such as literals, references, and functions, in the example language selecting a target node may be limited to a process of selection that is similar to references. In particular, selection of a target node may be similar to selecting source data using a reference, with exceptions including that a result is a container instead of a node sequence and a single output may always be provided instead of one or more outputs. For example, target "USERCOUNT" applied to a root node 314 of the description 300 may select a "USERCOUNT" container 316. Where more than one container match a selection, a first container may be selected. For example, "USER/FIRSTNAME", may resolve to a first FIRSTNAME container 316 instead of a second FIRSTNAME container 318 of the root node 314.

Assignment operations define how may be assigned from one or more source elements (such as a source node sequence) to a target element (such as a target container). A result of an assignment operation may be a sequence of completed transfers, each of them indicating which source node and which target node belong together.

Types of assignment operations in the example language may include a set assignment operation, an append assignment operation, and a merge assignment operation. A set assignment may clear a target container by removing all existing nodes and then appending all source nodes to the target container such that a resulting transfer sequence contains all appended nodes.

An append assignment operation may append all source nodes to a target container and keep any existing, contained nodes such that a resulting transfer sequence may contain all appended nodes.

A merge assignment operation may merge source and target nodes. In particular, a merge assignment operation may proceed by determining a number of nodes in a source sequence and in the target container; if the source node count is higher than the target node count additional nodes may be appended by their related index to the target container, otherwise the operation may proceed by doing nothing. For example, if a source sequence contains the nodes "1", "2", "3", "4", and "5" and a target container contains the nodes "A", "B", and "C", then a merge assignment operation may append the nodes "4" and "5", resulting in the target container containing the nodes "A", "B", "C", "4", and "5". If the source sequence contains the node "Alice" and the target container contains the node "John", nothing happens.

A resulting transfer sequence of a merge assignment operation may contain all source nodes with their target counterpart set to the target node sharing the same index. There may be two types of merge, a deep merge and a shallow merge. Deep merge may report all source nodes as having been transferred and shallow merge may only report those that are appended.

Statements (or mapping parts) may be nested, which may allow for chaining of statements. In general, a child statement may start from a source node or target container that was last accessed by a parent statement (which may be a node other than a root node) and a child statement may be performed for each selected source node of a parent statement. In a description document, a nesting of statements may be denoted by indenting a statement after a parent statement. For example, in the following comments which start with a "//" indicate a parent statement and a child statement:

---

'My first comment' -(APPEND)-> COMMENTS // parent statement
   'My first comment' -(APPEND)-> TITLE // child statement.

---

In that example, the child statement may start executing with a navigation point of a target document being a COMMENTS container, such that an example target document may include the following:

---

Node: null
  Container: "COMMENTS"
    Node: null
      Container: "TITLE"
        Node: "My first comment".

---

Although FIG. 3 is described with reference to an example language that has a certain definition of constructs, implementations may vary.

FIG. 4 is a description 400 of a type structure for a target document. The type structure may describe how deep structured data may be formatted in an example target document. The following description with reference to FIG. 4 is used to describe example applications of the example language discussed with reference to FIG. 3, including use of the example data description 300 of FIG. 3 as part of a source document.

An example statement may be USERCOUNT-(SET)→NUMBER_OF_EMPLOYEES. That statement includes a source expression that may result in a selection of the node 320 of the USERCOUNT container 316 with a starting navigation point of the root node 314. The target selection may select a NUMBER_OF_EMPLOYEES container of a target document that follows the type structure of the description 400 of FIG. 4, which includes a NUMBER_OF_EMPLOYEES container 410. The set assignment operation may the target container to contain exactly the source node such that after completion a target root node may look like:

---

Node: null
  Container: "NUMBER_OF_EMPLOYEES"
    Node: "2"

---

Additional mapping parts (statements) may be used to extend the content of the target, as mapping may be a sequence of mapping parts that get applied to a common source/target node. For example, a second mapping part may be USER/FIRSTNAME-(SET)→FIRSTNAMES.

Based on reusing the previous root nodes a target node may end up looking like:

---

Node: null
  Container: "NUMBER_OF_EMPLOYEES"
    Node: "2"
  Container: "FIRSTNAMES"
    Node: "John"
    Node: "Jeremy"
    Node: "Alice"

---

A third mapping part may be added to a mapping description to demonstrate usage of literals and an append operation, where the third mapping part may be '42'-(APPEND)→NUMBER_OF_USERS, and may result in a target document including:

---

Node: null
  Container: "NUMBER_OF_EMPLOYEES"
    Node: "2"
    Node: "42"
  Container: "FIRSTNAMES"
    Node: "John"
    Node: "Jeremy"
    Node: "Alice"

---

In some implementations, instead of getting the result above, an error situation may have occurred, as the "NUMBER_OF_EMPLOYEES" container might not have supported lists, in which case the mapping part may have failed.

An example of a more complex mapping part may include adding comments to a target structure based on the type structure description 400, and starting with a mapping description that does not include the three example mapping parts described above such that a target document does not include the results described above.

In the description 400 the "COMMENTS" container 420 is not primitive, as it represents a complex structure, such that adding a node to a target structure including that container might not accomplish much with a goal of adding comments to a target structure. Thus, nodes may be added to a "TITLE" container 430 and "DESCRIPTION" container 440 of the COMMENTS node 420, as otherwise there might not be any real values. As a target identifier of a mapping part might only allow selection of a direct child container, child mapping parts may be used to select a TITLE and DESCRIPTION container under a selected COMMENTS container.

An example mapping description may include:

```
'My first comment' -(APPEND)-> COMMENTS \\ parent mapping part
   'My first comment' -(APPEND)-> TITLE \\ child mapping part
```

The parent mapping part may append the "My first comment" literal node to a "COMMENTS" container of a target document. Since the "COMMENTS" container represents a complex structure, the value of the source node might not matter. The append assignment of the parent mapping part may append a complex node without value, causing the root target node to look like:

```
Node: null
   Container: "COMMENTS"
      Node: null
```

Now the transfer sequence may start, where every transfer may hold a source node and a target node, with a target node being the one that represents the source node in the target structure. Execution of the child mapping part may be for each transfer in a transfer sequence, with a source/target node of a current transfer sequence being used as a source/target node for the child mapping part. In the mapping given above the transfer sequence contains just one transfer. Consequently, the source node of this transfer is the 'My first comment' literal node, the target node is the empty complex node that was created within the "COMMENTS" container. Executing the child mapping part based on these nodes may extend the target to look like:

```
Node: null
   Container: "COMMENTS"
      Node: null
         Container: "TITLE"
            Node: "My first comment"
```

The target side continued where it left off from execution of a transfer sequence of the parent mapping part, selecting the "TITLE" container. Similarly, for the source side, the inner 'My first comment' literal node was selected.

As the literal of the parent mapping part was not transferred to the target, the empty expression may be used as an alternative. For example, a period may be used to indicate empty expressions, such that the same mapping description may be used:

```
'My first comment' -(APPEND)-> COMMENTS
   . -(APPEND)-> TITLE.
```

In that mapping description, the empty source expression of the inner mapping part may just reuse the 'My first comment' literal node that is transferred by the outer mapping part.

Similarly, as node values might not matter during an assignment phase if the target is complex, the following mapping description may be used:

```
. -(APPEND)-> COMMENTS
   'My first comment' -(APPEND)-> TITLE
```

Following the example, to add a description node, a mapping description may include the statement 'Some other description'-(APPEND)→DESCRIPTION as another child mapping part, such that a result is:

```
Node: null
   Container: "COMMENTS"
      Node: null
         Container: "TITLE"
            Node: "My first comment"
         Container: "DESCRIPTION"
            Node: "Some description"
```

As a parent mapping part may restart at navigating from a root node of a source document and a target document, the following mapping parts may yield a different result:

```
. -(APPEND)-> COMMENTS
   'Some description' -(APPEND)-> DESCRIPTION
```

Where the result may be

```
Node: null
   Container: "COMMENTS"
      Node: null
         Container: "TITLE"
            Node: "My first comment"
      Node: null
         Container: "DESCRIPTION"
            Node: "Some description"
```

In that example, there are two instances of comments as noted by two nodes under the comments container, one comment with a title, the other with a description.

Following examples may illustrate use of dynamic content as input. In addition, some examples may illustrate content structure transformation. The following examples may use a same source content of the description 300 of FIG. 3 and the same type structure of the description 400 for target content.

Nesting mapping parts that contain references in their source expression may work similar to literals. An example statement may be:

```
USER -(APPEND)-> EMPLOYEE
   FIRSTNAME -(APPEND)-> NAME
```

In that example, the child mapping part may be executed based on the transfer sequence of the parent mapping part, twice based on the example source of description 300 as there are two USER nodes 302, 304. Thus, a target may include the following:

```
Node: null
   Container: "EMPLOYEE"
      Node: null
         Container: "NAME"
            Node: "John"
            Node: "Jeremy"
      Node: null
         Container: "NAME"
            Node: "Alice"
```

The target is structured similarly to the source, as there are two nodes in the "EMPLOYEE" (formerly "USER") container, with the first one containing the two "NAME" (formerly "FIRSTNAME") entries "John" and "Jeremy", and the second one containing the one "NAME" (formerly "FIRSTNAME") entry "Alice".

Looking at a source structure from a slightly different angle, the source may be viewed as including nested lists, including an "EMPLOYEE" list that contains "NAME" lists as entries. If there is a desire to change the list layout in such a way that nodes move to a different level, transformations may be performed. One transformation might include collecting all names on a lowest level. As an example, the "USER" reference might not be placed in the outer source expression such that a mapping description includes:

```
. -(APPEND)-> EMPLOYEE
   USER/FIRSTNAME -(APPEND)-> NAME
```

As initially there is one node, the "EMPLOYEE" container receives one item. Based on the one entry in the transfer sequence, all subsequent "USER/FIRSTNAME" nodes are appended to the "NAME" container, such that a target may include:

```
Node: null
   Container: "EMPLOYEE"
      Node: null
         Container: "NAME"
            Node: "John"
            Node: "Jeremy"
            Node: "Alice"
```

Similar to a transformation of lists down to a single level, nodes may be moved up a level by moving the "FIRSTNAME" reference from the inner to the outer mapping part such that a mapping description may include:

```
USER/FIRSTNAME -(APPEND)-> EMPLOYEE
   . -(APPEND)-> NAME
```

That description may result in having as many nodes in an "EMPLOYEE" container as there are names in the source structure of a target document, where each name may be appended to the "NAME" container. Thus, a target document may include:

```
Node: null
   Container: "EMPLOYEE"
      Node: null
         Container: "NAME"
            Node: "John"
      Node: null
         Container: "NAME"
            Node: "Jeremy"
      Node: null
         Container: "NAME"
            Node: "Alice"
```

The source description 300 contains some users, all of which have exactly one identifier and last name. A goal of mapping may be to generate a single comment in a target structure, where for each user there may be a description entry that describes which identifier belongs to which user. To achieve the latter a function may be used to concatenate strings, named concat, which may expect three parameters, a prefix, a body and a suffix, and return a combination of the three as one string. A corresponding input type structure and output type structure may be structured as:

```
INPUT
   PREFIX
   BODY
   SUFFIX
OUTPUT
   RESULT
```

Since only one comment may be desired to be added, an initial entry node may be used to generate each comment. A literal based title may be used, as in a previous example. To generate one description entry per user function invocation may be chained directly to a user reference; were there multiple comments containing just one description entry the user reference may be moved to the outer mapping part. The goal might not include having a complex invocation result, but having a concatenated string residing within a "RESULT" container. To meet the goal, an example mapping description may include:

```
. -(APPEND)-> COMMENTS
   'Employee data' -(SET)-> TITLE
   USER/concat(
      LASTNAME -(SET)-> PREFIX
      ' has id ' -(SET)-> BODY
      ID -(SET)-> SUFFIX
   )/RESULT -(APPEND)-> DESCRIPTION
And this is the result:
Node: null
   Container: "COMMENTS"
      Node: null
         Container: "TITLE"
```

```
            Node: "Employee data"
              Container: "DESCRIPTION"
                Node: "Java has id 1234"
                Node: "Abap has id 5678"
```

In addition to the above examples, some mapping cases may be considered special. These cases may include cyclic mapping and incremental mapping.

Type definitions for source containers, target containers, or both may be based on XSD type structures and may be cyclic. For the type structures, reuse of types and elements may be used to indicate a cyclic structure. It may be possible to reuse types and elements on any level, even as part of a complex definition itself. In the latter case the type might never be displayed as a fully-expanded tree structure, as levels may get repeated ad infinitum. A simple example is a directory structure consisting of files and folders, with each folder potentially containing both files and more folders. Values based on such a type are finite, and drilling down into a given directory may eventually terminate in folders without further substructure.

To handle cyclic type definitions, mappings can be cyclic as well. Each mapping part may contain any number of child mapping parts, including itself or any of its parents. Staying with the directory structure example, a corresponding source and target type could look like this:

```
                SOURCE
                  FOLDER
                    FOLDER
                    FILE
                TARGET
                  DIRECTORY
                    DIRECTORY
                    ITEM
```

The types that have a same name and are in bold may represent a same type is reused such that a cyclic definition exists. As an example of cyclic type definition, the folder definition contains itself as substructure, so there can be folders in folder in folders as deeply nested as values require.

A mapping that transfers all source content to the target may look like:

```
            FOLDER -(APPEND)-> DIRECTORY
              FOLDER -(APPEND)-> DIRECTORY
              FILE -(APPEND)-> ITEM
```

The bold text of the mapping description indicates that a cyclic relationship exists and the bold text may be used as a signal to an interpretation engine that the mapping description includes a cyclic relationship as opposed to merely a copy of a same mapping part. On evaluation the folder mapping part descends to itself as long as folders contain child folders, causing a similar directory structure to get created.

Incremental mapping may involve a scenario where a mapping target does not start out empty and already contains initial content. For example, a source document and target document need not be distinct, and any content structure (i.e., type structure) may be used as both source and target within a same mapping.

One consideration when operating on overlapping source and target content is a sequence of evaluation. For the example language, an assignment operation only starts once all source nodes have been selected. In addition, the selection process does not rely on sources to remain constant, as the selection process maintains its own sequence of selected nodes. This behavior may effectively eliminate feedback situations during list processing. For example, appending a container to itself may duplicate all nodes once in sequence of appearance, and might not continue to loop indefinitely.

Because the selection process may maintain a separate reference to each selected node, child mapping part evaluation might not be affected by removal. For example, removal of a node from a target structure (e.g. due to a set assignment operation) may retain its structured content. Mapping parts already operating within a node may continue to do so, while the node itself might no longer be reached from the source structure.

Following are example BNF (Backus-Naur Form) s of the example language. A complex BNF representation of the example language, with the exclusion of cyclic mappings may include:

```
    MAPPING ::=             "{" PART_SEQUENCE "}"
                            | ;
    PART_SEQUENCE ::=       PART
                            | PART "," PART_SEQUENCE;
    PART ::=                REFERENCE ASSIGNMENT
                            EXPRESSION
                            | REFERENCE ASSIGNMENT
    EXPRESSION "{" PART_SEQUENCE "}"
    EXPRESSION ::=          "."
                            | STEP_SEQUENCE;
    STEP_SEQUENCE ::=       STEP
                            | STEP "/" STEP_SEQUENCE;
    STEP ::=                REFERENCE
                            | LITERAL
                            | INVOCATION;
    REFERENCE ::=           IDENTIFIER
                            | "@" IDENTIFIER
    INVOCATION ::=          IDENTIFIER "(" MAPPING ")";
    IDENTIFIER ::=          NAMESPACE ":" NAME
                            | NAME;
```

For that representation, references may be internally identified by Global Unique Identifiers (GUID). However, these identifiers may be both unwieldy and not readily available to users. Since mappings may be based on XSD structure types at disigntime, it may make sense for the BNF representation to include references by the XSD name of the field to which they are referring. One concern with this approach may be that because XSD knows both elements and attributes, both of them may overlap regarding their namespace or name. To determine whether an attribute or elements is being referenced, attribute references may have to be prefixed with an "@" character.

Also, for that representation, literals may be restricted to string only, as

LITERAL::="'"VALUE"'"; which may allow for extendibility, as future types may be added to the BNF representation in a way that does not introduce ambiguity, possibly by adding base type information to LITERAL, such as

```
    LITERAL ::=     "<" BASE ">" "'" VALUE "'";
    BASE ::=        "string"
                    | "integer"
                    | ...
```

For a sake of convenience, literals may be extended to also allow for integer and real values, such as by including in an BNF representation:

```
LITERAL ::=      STRING_LITERAL
                 | INTEGER_LITERAL
                 | REAL_LITERAL;
STRING_LITERAL ::= """ VALUE """;
INTEGER_LITERAL ::=[0-9]+;
REAL_LITERAL ::=   [0-9]+ "." [0-9]+;
```

These extensions might not conflict with any XSD based reference identifiers. Because mapping may automatically cast between closely related types (e.g. all finite integer), a more detailed distinction between base types (e.g. byte, short, int, long) might not be required. Base types neither string nor numeric may still be expressed as cast function.

As per escaping within the BNF representation, if namespaces and names adhered to the Namespaces in XML specification (REC-xml-names-19990114), namespaces might not need to be escaped within the BNF representation. This might not apply to literal values, as they may contain arbitrary characters, such that it may be essential that they are escaped in a way that eliminates potential clashes. One possible escaping mechanism may be to pick one single character as an escape character (e.g. the backslash "\"). Any occurrence of special characters (the quotation mark delimiting literal values and the escape character itself) may have to be prefixed with the escape character. Additionally, some characters might not be allowed to appear at all, such as a carriage return/linefeed pair. Disallowed characters may have to be entered by their Unicode identifier in four digit hex notation, which include prefixing the identifier with the escape character.

In contrast to the above representation, a simpler representation of the example language may offer improved readability while covering much mapping functionality. Such a representation may include:

```
EXPRESSION ::=       ".".
                     | STEP_SEQUENCE;
STEP_SEQUENCE ::=    STEP
                     | STEP "/" STEP_SEQUENCE;
STEP ::=             REFERENCE
                     | LITERAL
                     | INVOCATION;
REFERENCE ::=        IDENTIFIER
                     | "@" IDENTIFIER
INVOCATION ::=       IDENTIFIER "(" ")"
                     | IDENTIFIER
                       "(" PARAMETER_SEQUENCE ")";
PARAMETER_SEQUENCE ::= EXPRESSION
                     | EXPRESSION ","
                       PARAMETER_SEQUENCE;
IDENTIFIER ::=       NAMESPACE ":" NAME
                     | NAME;
```

The simpler representation may be used to express correlation rules, which may be used to extract Boolean values without assigning results to target structures. In addition, the representation includes simplified function invocation, and mappings and mapping parts are no longer required. Instead of handling function invocation parameters as mapping, the simpler representation is based on a parameter sequence as commonly found in most programming languages (such as JAVA).

Input parameters may be given in a same order as they appear in a function input interface, skipping none. Since each parameter is provided as an expression, values may only be passed on as selected from the source, on-the-fly transformation as found in the mapping based invocation is not possible.

Output parameters may lose their first structure level. In general, in the example language, invocation results may be contained as named fields within a complex return structure. The simpler representation directly treats the contents of such a named field as a return value, no longer requiring the return value reference step to be chained to the invocation step. This may come at the cost of not supporting the complete function set, functions returning multiple distinct results (e.g. some web services) can not be addressed.

In order to stay closer to XPATH, two Boolean functions, true( ) and false( ), may be introduced, which may return a Boolean true and false value, respectively. The simpler representation might not allow these two constants to be directly part of LITERAL due to naming conflicts with references.

Extensions of the example language may include reference modifiers, predicates, and XSLT (eXtensible Stylesheet Language Transformation) mapping parts. As per reference modifiers, they may be a way to shift hierarchy levels. In general, because expression steps may be treated always as a child relation references might only descend into source structures such that there is no way to move back towards the root for further content. It may be possible to get around this restriction by merging targets at parent mapping part level; however, that might not always be the case. For example, consider the following mapping description:

```
USER -(APPEND)-> EMPLOYEE
  FIRSTNAME -(APPEND)-> NAME
```

For each user an employee is created, each of which receives all first names of the corresponding user as name. Now suppose the USERCOUNT in the source structure is actually a department name we want to assign as child node to every employee. Because employee nodes have to be first generated from user nodes, there may be no way around the source selection residing on the user level; which may be unfortunate if the selection need to navigate to the root node to select the user count. In this situation, the merging assignment operation would not help as it would require as many user count nodes as there are users. The situation may be handled by introducing absolute references where a modifier may move a source or target selection back to a root node. For example, the following description includes navigation below a USER node in a child mapping part by having an absolute reference to a usercount node:

```
USER -(APPEND)-> EMPLOYEE
  FIRSTNAME -(APPEND)-> NAME
  /USERCOUNT -(APPEND)-> DEPARTMENT
```

The same result may be achieved by parent references, which may include a modifier that moves a source selection back one level towards a root. For example, the following example includes navigation across a hierarchy level toward a root node:

```
USER -(APPEND)-> EMPLOYEE
  FIRSTNAME -(APPEND)-> NAME
    ../USERCOUNT -(APPEND)-> DEPARTMENT
```

Both types of reference may be desired, as they do not behave identical when applied to lists. For example if a source selection is located in a "FIRSTNAME" node, "/USER/LASTNAME" would select all last names of all users, while ".../LASTNAME" may just select the last names of a current user.

As per predicates, predicates similar to XPATH predicates may be introduced into the example language and may support direct index access (either 0-based or 1-based) into a value. For example, the example language might need a built-in construct to restrict a node sequence obtained by evaluating source expressions. While it may be possible to write functions for that purpose (e.g. a function to pick the first entry from a list), this would be a very cumbersome approach. Functions may be required to be strongly typed, both regarding input and output. Contrary to that, a restriction process in a common form is not interested in types at all, just in filtering a list of anything based on its list position. Having to write and employ multiple, essentially identical functions for different types of data (e.g., pick the string first entry from a list of strings, pick the Boolean first entry from a list of Boolean values, and the like) may be considered inelegant. In contrast to a function-based approach, a predicate approach may be employed. An example source selection including a predicate may be USER[1], which may result in a selection of a first USER node. For predicates, a negative index position may be treated as access in reverse list sequence (e.g., −1 may always select the last list entry; e.g., USER[−1] may select a last user).

Predicates may apply to one or more steps. As examples:

```
USER/NICKNAME[1] //first case
(USER/NICKNAME)[1] //second case
```

In the first case, the first nickname of each user is selected. In the second case, the first nickname of any user is selected. Both variants may be achieved in a backwards-compatible way by introducing selection predicates on a step level while making expressions a valid step candidate, in a description of the language.

Further extensions may involve selection lists (e.g., pick the first, third and last entry) and selection ranges (e.g., pick the second to fifth entry). Ultimately, expression predicates could be added, allowing filtering based direct or hierarchical content. For example, such a filtering predicate may be USER[NICKNAME="John"], where the nickname of John is a filtering predicate for user nodes.

As per XSLT mapping parts, mapping functionality of the example language may be combined with an alternative mapping parts language to allow for handling complex content. For example, the example language mapping parts may be made abstract, with the current representation becoming referred to as modeled mapping parts and XSLT mapping parts may be a second type of mapping part that consists only of an XSLT transformation, potentially stored as file. At runtime, whenever mapping encounters an XSLT mapping part, a transformation roundtrip takes place. The source/target nodes at the mapping cursor are converted to XML, the XSLT file is applied, the resulting XML is converted back to replace the contents of the target node. Processing of child mapping parts continues on the assumption that only one transfer took place, that of the source node to the target node. Because mappings may consist of only a single mapping part, this approach may allow for whole mapping roundtrips to be handled as XSLT.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer program product, tangibly embodied in a non-transitory computer-readable medium, the computer program product being configured to cause data processing apparatus to perform operations comprising:
    receiving, using one or more processors of the data processing apparatus, data characterizing a source document, a target document, and a first statement, data in the source document comprising elements including at least one source node and at least one source container, data in the target document comprising elements including at least one target node and at least one target container, the first statement defining a mapping from one or more source nodes out of the at least one source node to one or more target containers out of the at least one target container in which the one or more source nodes are to be placed, the first statement being defined in accordance with a mapping language for describing mappings between the one or more source nodes and the one or more target containers where the first statement expressed as a combination of a source selection, an assignment operation, and a target selection represents performing the assignment operation for each instance of each element of the source document matching the source selection for a hierarchy level of the first statement associated with a hierarchy of elements in the source document, the first statement comprising the one or more source nodes, the assignment operation, and the one or more target containers;
    evaluating, using the one or more processors, the first statement to find instances of the one or more source nodes identified by the first statement, the one or more source nodes being part of the hierarchy of elements in the source document; and
    for each of the instances of the one or more source nodes found based on the evaluating the first statement to find instances of the one or more source nodes,
        determining, using the one or more processors, instances of the one or more target containers to which to map data from the one or more source nodes, the determining comprising navigating through a hierarchy of elements of the target document being different from the hierarchy of elements of the source document, the navigating being defined by the first statement; and
        populating, using the one or more processors, the instances of the one or more target containers with data from the instances of the one or more source nodes based on the determining.

2. The product of claim 1, wherein the source selection comprises a reference to the elements.

3. The product of claim 1, wherein the source selection comprises a function that when executed results in selection of the one or more source nodes.

4. The product of claim 1, wherein the populating results in the one or more source nodes being populated in a different hierarchy level in the target document.

5. The product of claim 1, wherein the source selection of the first statement comprises an expression in accordance with a format similar to XPATH (eXtensible Markup Language Path Language).

6. The product of claim 1, wherein the first statement is part of a mapping description in accordance with the mapping language.

7. The product of claim 6, wherein the mapping language is combined with another mapping language such that the first statement of the mapping language is used in association with a mapping statement of the another language.

8. The product of claim 1, wherein the first statement is related to a second statement being a child statement depending on the first statement, and the operations further comprise evaluating the second statement based on the evaluation of the first statement.

9. The product of claim 1, wherein:
    the elements of the source document are data represented in hierarchical levels in a data structure in the source document,
    the elements of the target document are data represented in hierarchical levels in a data structure in the target document, and
    the hierarchical levels can be shifted using reference modifiers.

10. The product of claim 1, wherein the assignment operation comprises at least one of the following:
    a set assignment operation clearing a target container by removing all existing target nodes and then appending all source nodes to the target container to obtain a resulting transfer sequence at the target container;
    an append assignment operation appending all source nodes to existing target nodes at the target container to obtain a resulting transfer sequence at the target container; and
    a merge assignment operation merging source nodes of a source sequence and target nodes of the target container to obtain a resulting sequence at the target container.

11. A method comprising:
    receiving data characterizing a source document, a target document, and a first statement, data in the source document comprising elements including at least one source node and at least one source container, data in the target document comprising elements including at least one target node and at least one target container, the first statement defining a mapping from one or more source nodes out of the at least one source node to one or more target containers out of the at least one target container in which the one or more source nodes are to be placed, the first statement being defined in accordance with a mapping language for describing mappings between the one or more source nodes and the one or more target containers where each statement expressed as a combination of a source selection, an assignment operation, and a target selection represents performing the assignment operation for each instance of each element of the source document matching the source selection for a hierarchy level of the statement associated with a hierarchy of elements in the source document, the first statement comprising the one or more source nodes, the assignment operation, and the one or more target containers;

evaluating the first statement to find instances of the one or more source nodes identified by the first statement, the elements being part of the hierarchy of elements in the source document; and for each of the instances of the one or more source nodes found based on the evaluating the first statement to find instances of the one or more source nodes, determining instances of the one or more target containers to which to map data from the instances of the one or more source nodes, the determining comprising navigating through a hierarchy of elements of the target document being different from the hierarchy of the elements of the source document, the navigating being defined by the first statement; and populating the instances of the one or more target containers with data from the instances of the one or more source nodes based on the determining.

12. The method of claim 11, wherein the source selection comprises a reference to the elements.

13. The method of claim 11, wherein the source selection comprises a function that when executed results in selection of the one or more source nodes.

14. The method of claim 11, wherein the populating results in the elements of the source document being populated in a different hierarchy level in the target document.

15. The method of claim 11, wherein the source selection of the first statement comprises an expression in accordance with a format similar to XPATH (eXtensible Markup Language Path Language).

16. The method of claim 11, wherein the first statement is part of a mapping description in accordance with the mapping language.

17. The method of claim 11, wherein the first statement is related to a second statement being a child statement depending on the first statement, and the method further comprises evaluating the second statement based on the evaluation of the first statement.

18. A computer program product, tangibly embodied in a non-transitory computer-readable medium, the computer program product being configured to cause data processing apparatus to perform operations comprising:

receiving, using one or more processors of the data processing apparatus, data characterizing a source document, a target document, and a plurality of statements comprising a first statement and a second statement, each of the first and second statements defining mappings from one or more elements of the source document to one or more elements of the target document, and the second statement being a mapping depending on an evaluation of the first statement, the elements of the source document being one or more source nodes and one or more source containers, the elements of the target document being one or more target nodes and one or more target containers in which the one or more source nodes are to be placed, the first statement comprising at least one source node out of the one or more source nodes, the assignment operation and at least one target container out of the one or more target containers;

evaluating, using the one or more processors, the first statement to find instances of first elements of the source document identified by the first statement, the elements being part of a hierarchy of elements in the source document, the instances identified by a selection of a type of element in the first statement; and for each of the instances of the first elements of the source document found based on the evaluating the first statement to find instances of the first elements of the source document, determining, using the one or more processors, instances of the first elements of the target document to which to map data from the instances of the first elements of the source document, the determining comprising navigating through a hierarchy of elements of the target document being different from the hierarchy of elements of the source document, the navigating being defined by the first statement;

populating, using the one or more processors, the instances of the first elements of the target document with data from the instances of the first elements of the source document, the populating comprising:

for each of the instances of the first elements of the target document, evaluating, using the one or more processors, the second statement to find instances of second elements of the source document being at a lower hierarchy level in the source document than a corresponding instance of the first elements of the source document on which an instance of the second element depends; and for each of the instances of the second elements of the source document found based on the evaluating the second statement to find instances of the second elements of the source document, determining, using the one or more processors, instances of the second elements of the target document to which to map data from the instances of the second elements of the source document, the determining comprising navigating through the hierarchy of elements of the target document, the navigating being defined by the second statement; and populating, using the one or more processors, the instances of the second elements of the target document with data from the instances of the second elements of the source document.

19. The product of claim 18, wherein the first statement comprises a source selection that comprises a reference to the elements.

20. The product of claim 18, wherein the first and second statements are defined in accordance with a language for describing mappings between elements of source documents and elements of target documents where each statement expressed as a combination of a source selection, an assignment operation, and a target selection represents performing the assignment for each instance of each element of a source document matching the source selection for a hierarchy level of the statement.

* * * * *